on a continuous basis.  Live steam is conventionally used
United States Patent Office 3,155,458
Patented Nov. 3, 1964

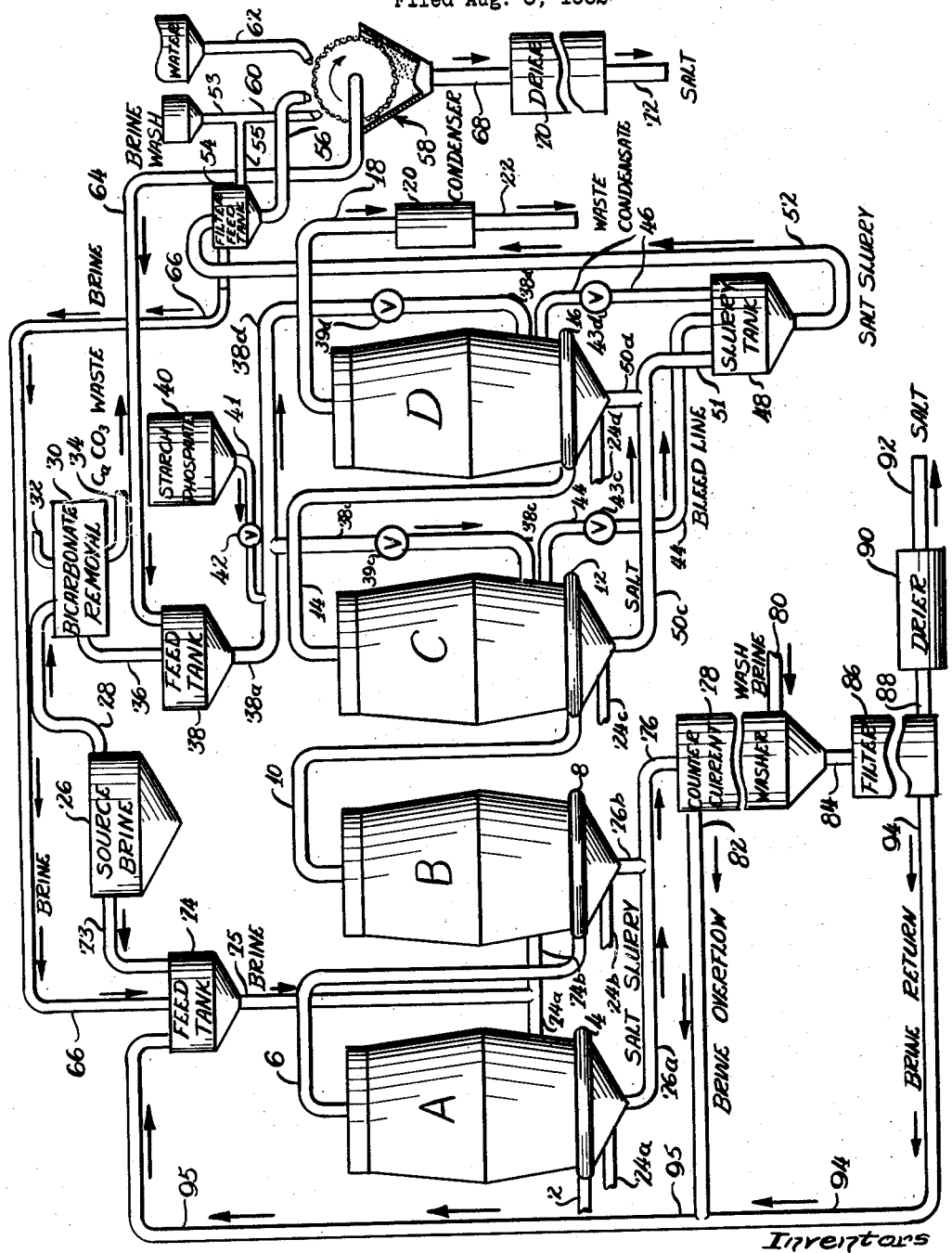

3,155,458
PROCESS FOR PRODUCING SALT
Howard W. Fiedelman and Richard L. Lintvedt, Woodstock, Ill., assignors to Morton Salt Company, Chicago, Ill., a corporation of Delaware
Filed Aug. 8, 1962, Ser. No. 215,733
14 Claims. (Cl. 23—300)

This invention relates to a process for preparing salt from sodium chloride brines and more particularly to an improved method of producing a high purity salt of exceptionally low calcium sulfate content.

The production of sodium chloride or salt by the concentration of sodium chloride brines is a well known and widely practiced art. One such process for producing crystalline sodium chloride involves the crystallization of salt from a saturated brine by evaporation at elevated temperatures in vacuum pans. In such procedures it is a common practice to prepare a brine either by the dissolution of crude rock salt or by in situ brine formation achieved by pumping water down into so-called brine wells to dissolve salt in a subterranean salt deposit, and removing the saturated brine. The brines prepared by either of these methods commonly contain a relatively substantial amount of calcium sulfate in solution. The amount of calcium sulfate in a saturated brine solution is of course variable, depending upon the source, but generally it ranges from about 2 to 5.5 grams of calcium sulfate per liter. In addition to calcium sulfate the brine may also contain calcium chloride in amounts up to about 9.0 grams per liter and approximately from 0.1 to about 0.3 gram per liter of calcium bicarbonate. Some brines may contain small amounts of magnesium chloride.

The prior art techniques for recovering crystalline salt from such saturated brines involves the use of multiple effect vacuum pans wherein the brine is fed into the system on a continuous basis. Live steam is conventionally used to heat the saturated brine in the first vacuum pan in the series. The water vapors produced by the evaporation of the brine in the number 1 vacuum pan are passed to a jacket or heat exchanger on the number 2 pan to provide a heat source for the operation of that pan. The other pans in the system are likewise heated by the vapor recovered from the preceding pans in succession. In this procedure it is of course preferred and practical to operate the pans at subatmospheric pressure so that a high rate of evaporation, i.e. boiling, is maintained in each of the vacuum pans in sequence. Conventionally in a three pan system the degree of vacuum is such as to maintain a boiling temperature of about 220° F. in the first pan, 180° F. in the second pan, and 145° F. in the third pan. Of course, it may be understood that operations of this type are reasonably flexible and that variations in the above temperatures and the temperature drop between the various pans are conventional.

As stated above, a principal impurity present in feed brines is dissolved calcium sulfate. Calcium sulfate exhibits inverse solubility with temperature and accordingly at higher temperatures the brine solution has a smaller capacity for dissolving the calcium sulfate present. In view of this inverse solubility it is common practice to keep a suspension of solid calcium sulfate in the pans during the salt crystallization process to prevent scaling of the heating surfaces. Ordinarily the amount of solid calcium sulfate present in the individual evaporators is from about 20 to 200 grams per liter. Inasmuch as the calcium sulfate is not ordinarily removed from the system in conventional operations, the calcium sulfate content of each evaporator usually builds up during the course of a run.

In the above described conventional procedure for producing salt, the evaporation and concentration of the saturated brine results in concomitant crystallization and precipitation of crystalline sodium chloride and crystalline calcium sulfate particles. The crystalline sodium chloride admixed with solid calcium sulfate is removed as a slurry in supernate brine from the various pans, combined and passed through a countercurrent washer where the salt particles are washed with a saturated brine solution to remove a major proportion of the solid calcium sulfate. The function of the brine washing step is to provide a method of hydraulic particle classification to reduce the amount of intermixed external impurities, i.e. solid calcium sulfate. Solid calcium sulfate is also present in the crystalline salt product produced by this procedure as an internal impurity or "inclusion" within the salt crystals, which of course cannot be removed by countercurrent washing.

Accordingly, it would be desirable to carry out the crystallization of salt under conditions which would substantially prevent the development and crystallization of calcium sulfate concomitantly with the crystallization of the salt. This would, of course, eliminate the problem of external impurities, such as admixed calcium sulfate in the form of anhydrite, hemihydrate or gypsum, which must be removed by washing techniques and also inclusions of these solid calcium sulfate crystalline forms which cannot be removed by washing, however long and extended.

Accordingly, it is an object of the present invention to provide a process for producing solid sodium chloride by the crystallization of salt from saturated brines containing calcium sulfate in solution, which results in a salt of exceptionally high purity and low calcium sulfate content.

It is a further object to provide a process for the production of a salt which has virtually no calcium sulfate present as an inclusion within the salt crystals.

A still further object is the provision of a process for producing salt which is essentially free of solid calcium sulfate as an external impurity.

A still further object is the provision of a vacuum pan process for crystallizing salt which does not require the presence of solid calcium sulfate in the brine during the crystallization step.

A still further object of the present invention is the provision of a process for crystallizing salt from a brine essentially free of solid calcium sulfate, which is operable without scaling of heating surfaces of the evaporator unit.

Another object is to provide a method for the production of salt having a low calcium sulfate content which method is easily adapted to conventional vacuum pan salt production processes.

A still further object is to provide a method for the production of salt having a low calcium sulfate content which process has no effect on the size, shape or crystalline structure of the resultant salt.

In one broad form the present invention comprises a process of inhibiting the crystallization of calcium sulfate during the crystallization of salt from an essentially bicarbonate-free sodium chloride brine having calcium sulfate dissolved therein which comprises crystallizing salt from a body of said brine by evaporation and concentration thereof in the presence of starch phosphate.

A further embodiment of this invention comprises a method of preparing a high purity crystalline sodium chloride having a reduced calcium sulfate content which comprises continuously feeding a saturated essentially bicarbonate-free sodium chloride brine containing dissolved calcium sulfate into a crystallizing and evaporating chamber, concentrating and evaporating said brine preferably at a temperature below about 225° F., in the presence of at least about 5 parts per million on a saturated brine basis, of starch phosphate, concomitantly bleeding brine from said chamber, the rate of feed and bleed of the brine solution being such as to maintain the calcium sulfate in the evaporating brine in the dissolved state, and continuously withdrawing solid sodium chloride crystals from the evaporating zone.

Starch phosphate referred to above is a product prepared by reacting starch with phosphate salts as disclosed in U.S. Patent No. 2,884,412, to form the ester which has many properties different from the starch from which it is made. Broadly, the starch phosphate contains from about 0.5 to 5% bound phosphorus and preferably from 1 to 2%.

As previously stated, the total calcium sulfate content of each evaporator builds up during the course of a run. It has been found that a small quantity of starch phosphate has the wholly unexpected property of increasing the solubility of calcium sulfate in salt brine. It has been determined that when small amounts of starch phosphate are added to salt brine containing dissolved calcium sulfate, it becomes feasible to continuously "bleed off" brine solution from the evaporator and prevent crystallization of calcium sulfate. The starch phosphate functions to allow more water to be evaporated from the brine before calcium sulfate exceeds its solubility in the brine and crystallizes out.

In its function the starch phosphate appears to enhance the solubility or supersaturation of calcium sulfate in brine to a degree far exceeding that which might ordinarily be expected by so small an amount of additive. It is not understood exactly how the starch phosphate accomplishes the prevention of calcium sulfate precipitation or crystallization, but the complete understanding of the theory of operation is not essential to the operation of this process. It is also important to the successful operation of this process that the small quantity of bicarbonates, such as calcium bicarbonate, sometimes accompanying salt brine, be removed as its presence has a deleterious effect on this process. Accordingly, as is hereinafter described, a bicarbonate removal step is included in the overall process as an initial brine preparatory procedure. Generally the brine should be essentially bicarbonate free. It should be understood that small amounts of bicarbonate can be tolerated and "essentially bicarbonate free" as used in the context of this invention, includes concentrations of bicarbonate of up to 20 p.p.m. in the brine.

The starch phosphate additive should be present in an amount of from 5 to about 500 parts per million and preferably from about 10 to about 50 parts per million on a saturated brine basis. The concentration of the additive in the salt crystallization process may also be expressed on a salt basis, in which case, the salt being approximately 25% to 26% by weight of the saturated brine, values would be approximately four times those stated above with respect to the saturated brine or from 20 to 2000 parts per million in the broad range, and from 40 to 200 parts per million in the preferred range.

While the temperatures contemplated for the present process are broadly variable below the 225° F. upper limit, down to about 85° F., in the most preferred instance the process should be carried out at temperatures between 165° F. and about 90° F., it being understood that the broad considerations expressed herein are applicable to temperatures below these lower values, although in the use of lower temperatures the typical process is not economical.

In the preferred operation of the process of this invention, the rate of continuous feed and bleed of the brine should be adjusted to maintain the calcium sulfate in solution during the crystallization process. In the conventional vacuum pan operation the raw brine is continuously evaporated to produce a crystalline sodium chloride. In such a crystallization operation a substantial amount of solid calcium sulfate is formed when the solubility limit is exceeded. Accordingly, it has been found necessary to continuously and concomitantly feed sodium chloride brine into the evaporating and concentrating (i.e. vacuum) pan, and continuously withdraw or bleed brine having an enriched dissolved calcium sulfate content from the chamber.

The amount or proportion of the feed brine which is bled varies from about 45% to about 70% with about 60% being optimum.

For a clearer understanding of the present process reference should be had to the drawing which comprises a flow sheet or schematic diagram illustrating in one form the apparatus utilized in carrying out the process of the present invention.

In that drawing a plurality of vacuum pans or evaporators A, B, C and D are schematically illustrated, showing their arrangement in the process of the present invention. For the purposes of this invention, the pans C and D are referred to as the "feed and bleed" evaporators, and pans A and B as the "conventional" evaporators. The vacuum pans A, B, C and D herein used for brine concentration are arranged in cascade fashion with respect to the heat source. Thus, steam is fed to steam jacket 4 in evaporated A through steam line 2. The vapor from evaporator A passes through vapor line 6 to steam jacket 8 on evaporator B. Likewise vapor from evaporator B passes through line 10 to steam jacket 12 on evaporator C and vapor from evaporator C passes through vapor line 14 to steam jacket 16 on evaporator D. The vapors from evaporator D are conventionally passed via line 18 to condenser 20 and passed via line 22 out of the system. The condensate may be used for washing or other purposes as hereinafter described. In each instance, condensate from the steam jackets 4, 8, 12 and 16 is removed from the system by means of lines 24a, 24b, 24c and 24d, respectively. This condensate may be returned to the steam generator or boiler (not shown) for reheating.

As further illustrated in the drawing, source brine in chamber 26 passes via feed line 28 to bicarbonate removal tank 30 where it is intimately mixed with sodium hydroxide solution which is fed into bicarbonate removal tank 30 via feed line 32. The amount of sodium hydroxide solution employed in this bicarbonate removal step is usually that quantity required to produce a pH of about 8.5. Preferably the sodium hydroxide is introduced as a 50% (by weight) solution, although more dilute solutions may be effectively employed. The mass is agitated by any convenient means (not shown) for a period of about 30–60 minutes to allow for complete reaction. The mixture is allowed to stand so that the resultant precipitate of calcium carbonate may settle (3 to 4 hours). The calcium carbonate precipitate is conveniently removed from the system through effluent line 34. In this bicarbonate removing procedure, a flocculating agent may conveniently be added after the precipitation reaction is complete to speed the rate of precipitate settling. The bicarbonate-free supernate is passed from tank 30 via line 36 to brine feed tank 38. Alternately, the bicarbonate-free supernate in bicarbonate removal tank 30 may be stored in a separate tank (not shown) for subsequent supply to brine feed tank 38.

Bicarbonate-free brine from brine feed tank 38 is fed through feed line 38a to evaporating tanks C and D via the divisional feed lines 38c and 38d, respectively. Intermediate valves 39c and 39d regulate the flow of input brine. The starch phosphate additive, contained in the additive feed drum 40, is conveniently added to evaporators C and D through feed line 41. The rate and amount of additive feed may be controlled by means of valve 42 or other conventional metering devices. Conveniently, a water solution of up to about 4% by weight starch phosphate is employed. This concentration, however, is not critical and may be varied. Brine is bled from the evaporators by bleed lines 44 and 46 leading from evaporating tanks C and D, respectively, to slurry tank 48. Brine containing dissolved calcium sulfate is removed from the evaporating chamber continuously via bleed lines 44 and 46 so that calcium sulfate does not crystallize and contaminate the sodium chloride. The rate of bleed is controlled by valves 43c and 43d in lines 44 and 46. The bleed brine ordinarily also contains a small amount of crystalline salt which may, if desired, be separated therefrom by conventional means (not shown) and returned to the evaporators. Salt crystals of solid sodium chloride from evaporators C and D in slurry of supernate brine form are also fed into slurry tank 48 through lines 50c and 50d, respectively, which combine into common line 51. The salt slurry in tank 48 is conducted through line 52 to filter feed and washing tank 54. Salt crystals in said slurry are washed with fresh brine introduced by lines 53 and 55 and are passed through conduit 56 onto rotary vacuum filter 58. Brine overflow from the filter feed and washing tank 54 is passed via line 66 to brine feed tank 74 for feed to the conventionally operated evaporators A and B. There is a small quantity of starch phosphate introduced into evaporators A and M via brine overflow line 66 from filter feed tank 54. However, this has no effect on the salt produced by evaporators A and B because starch phosphate is adsorbed on the suspended calcium sulfate present (20–200 grams per liter) and is thereby inactivated and subsequently removed with the excess calcium sulfate by the counter-current washer. The salt on filter 58 is washed with water (such as condensate) from line 62. The screen on rotary filter 58 is washed clean with brine from line 60. Filtrate wash brine from the rotary filter 58 is recovered and returned for re-use to tank 38 through return line 64.

The solid salt recovered from the rotary filter 58 is passed via line 68 to drier 70 and then recovered as dry salt at the effluent of line 72, where it may be further processed by grading, packaging or the like.

The conventionally operated vacuum pans or evaporators A and B receive brine from brine feed tank 74 via common line 75 and lines 74a and 74b. The brine in tank 74 may be supplemented by brine from tank 26 through line 73. The solid salt crystals recovered from evaporators A and B, containing a substantial amount of solid calcium sulfate admixed therewith, are removed via lines 76a and 76b combined in line 76 and passed through countercurrent washer 78 where the salt is washed with brine introduced by line 80 to remove external calcium sulfate particles. The effluent wash brine from washer 78 is passed via line 82 and line 95 to feed tank 74 for recycle through evaporators A and B.

The salt from countercurrent washer 78 is passed via line 84 to filter 86 for debrining and thence via line 88 to drier 90. Brine supernate recovered at filter 86 may be recycled to brine feed tank 74 through conduits 94 and 95. The dried salt is recovered from drier 90 at effluent 92 and may be further processed by grading, packaging or the like.

In the drawing, bleed lines 44 and 46 are shown as feeding into slurry tank 48. Alternately, bleed lines 44 and 46 may feed into a separate settling tank (not shown) where entrained solid salt is either returned to evaporators C and D or to the salt effluent thereof, with the bleed brine being passed to brine feed tank 74 for introduction into evaporators A and B.

In one specific example, the process of the present invention is carried out in the described apparatus as saturated brine (pH about 7) containing dissolved calcium bicarbonate 0.2 gram per liter, and calcium sulfate, 5 grams per liter, is passed from source 26 to bicarbonate removal tank 30 and treated with 50% aqueous sodium hydroxide solution at a rate of 200 pounds per 100,000 gallons of brine to remove calcium bicarbonate. The period of agitation is about 30 minutes with a period of about 4 hours for settling out of the formed calcium carbonate precipitate which is removed through line 34. The treated brine, passed via conduit 36 to feed tank 38, has a pH of about 8.5 and bicarbonate content of less than 20 p.p.m. The dissolved calcium sulfate content is the same, i.e. 5 grams per liter.

The bicarbonate-free brine from tank 38 is fed into evaporators C and D at rates of 175 and 100 gallons per minute, respectively. A 3% aqueous solution of starch phosphate (containing about 2% phosphorus in the starch phosphate) is introduced into the brine feed at a rate to produce a concentration on a saturated brine basis of 25 p.p.m. The vacuum pan C was maintained at 145–147° F. and a pressure of 5.5 inches of mercury (absolute), and pan D at a temperature of 90° F. and a pressure of 1.5 inches of mercury (absolute). The rate of bleed from evaporator C was 110 gallons per minute (about 63% of feed) and the rate of bleed from evaporator D was 50 gallons per minute (about 50% of feed). The concentration of calcium sulfate in the bleed brine from evaporator C was 8.5 grams per liter and in bleed from evaporator D, 9.0 grams per liter. The solid crystalline salt from evaporators C and D was recovered by washing with fresh brine and then with water on the vacuum rotary filter. The dried salt product contained 30 p.p.m. calcium sulfate expressed as calcium. The bleed brine from pans C and D supplemented with fresh brine was used as feed for pans A and B operated in a conventional manner, i.e. pan A at 222° F. and a pressure of 27 inches of mercury (absolute) and pan B at 180° F. and a pressure of 11 inches of mercury (absolute) to produce salt containing 750 p.p.m. calcium sulfate expressed as calcium.

Salt produced by the conventional system as exemplified by evaporating pans A and B contains approximately 300 to 1500 parts per million of calcium sulfate, expressed as calcium. Salt produced by a "feed and bleed" system, using starch phosphate as described in the operation of evaporating pans C and D, conventionally contains about 50 parts per million or less of calcium sulfate, expressed as calcium. This is regarded as a significant decrease in calcium sulfate content by the salt industry and represents an achievement in the production of pure salt.

Several extended runs of salt were produced by the process of this invention utilizing various levels of starch phosphate in the brine. In each instance the feed brine had a calcium sulfate content of 5 grams per liter and a bicarbonate content (after treatment) of 20 p.p.m. The following table sets forth the conditions and results obtained in each run:

*Table*

| Runs | A | B | C |
|---|---|---|---|
| Starch phosphate (p.p.m. in brine) | 31 | 13.7 | 22.4 |
| Length of runs, hours | 30 | 164 | 58 |
| Tons of salt produced | 96 | 558 | 302 |
| Calcium sulfate content of product as p.p.m. calcium [1] | 25–35 | 40–50 | 25–35 |
| System | (2) | (3) | (4) |

[1] Expressed as a range for salt continuously produced throughout the entire run.

[2,3] Runs A and B were carried out in the No. 4 pan of a quadruple effect evaporator. The temperature was about 90° F. and the brine bleed was 55% of the brine feed. Salt produced by conventional processing in pans 1, 2 and 3, had a calcium sulfate content expressed as p.p.m. calcium ranging from about 300 to about 800 during the run.

[4] Run C was carried out in the No. 2 and 3 pans of a triple effect evaporator. The temperatures were about 160° F. for pan No. 2, and 120° F. for pan No. 3. The bleed in pan No. 2 was 65% of the feed brine, and in pan No. 3 was 60% of the feed brine. Salt produced by conventional processing in pan No. 1 has a calcium sulfate content (expressed as p.p.m. calcium) ranging from about 500 to about 1000 during the run.

It is known that salt containing calcium sulfate has certain drawbacks. For example, in the processing of leguminous vegetables, such as peas and beans, calcium reacts with the pectin in the skin forming calcium pectinate. This results in a toughening of the skin so that a salt low in calcium is required for processing these vegetables. Salt containing conventional amounts of calcium sulfate tends to cause grittiness in butter, and in other fats and oils enhances the promotion of rancidity. A low calcium content in brine is necessary to prevent precipitation of calcium phosphate in those pickling brines containing phosphates which are conventionally used in the treatment of ham.

From the foregoing it may be seen that the process of the present invention results in a salt product of unusual purity. During the operation of the process it was not necessary to add the usual 20–200 grams per liter of solid calcium sulfate to "feed and bleed" evaporators, and it was observed that no scaling of the heating surfaces occurred in these pans, and that substantially no solid phase calcium sulfate impurity, either internal or external, was present in the resultant salt. The pH is not critical and a broad range of pH values from about 4 to 12 would be operative.

It should be understood that it is possible to carry out the process of the present invention without the use of a separate "brine bleed" conduit although this is not a preferred procedure. In carrying out such operations a combination of brine and salt is "bled" from the bottom of the evaporators C and D via lines 50c and 50d continuously or at convenient intervals, for further processing by means of filtration, washing and drying.

While a preferred embodiment of the present invention involves the overall process as described above using the bleed brine as indicated, it is also contemplated that one aspect of the invention may be practiced by either wasting the bleed brine or storing it separately for subsequent recovery.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process of inhibiting the crystallization of calcium sulfate during the crystallization of salt from an essentially bicarbonate-free sodium chloride brine having calcium sulfate dissolved therein which comprises crystallizing salt from a body of said brine by evaporation and concentration thereof in the presence of starch phosphate.

2. The process of claim 1 wherein the starch phosphate is present in an amount of from 5 to 500 p.p.m. on a saturated brine basis.

3. In a process of producing crystallized sodium chloride from an essentially bicarbonate-free sodium chloride brine having calcium sulfate dissolved therein, the step of crystallizing salt from said brine by evaporation in the presence of starch phosphate.

4. In a process of producing crystallized sodium chloride from an essentially bicarbonate-free sodium chloride brine having calcium sulfate dissolved therein, the steps of concentrating and crystallizing salt from a body of said brine by evaporation of the brine in the presence of starch phosphate and concomitantly withdrawing brine from said body having an enriched dissolved calcium sulfate content.

5. A process for preparing a high purity crystalline sodium chloride having a reduced calcium sulfate content, which comprises continuously feeding an essentially bicarbonate-free sodium chloride brine containing dissolved calcium sulfate into an evaporating and crystallizing chamber, concentrating and evaporating said brine at a temperature below about 225° F. at reduced pressure in the presence of at least about 5 parts per million on a saturated brine basis of starch phosphate to produce a crystalline sodium chloride, concomitantly bleeding brine from said evaporating chamber, the rate of feed and bleed of said brine being adjusted to maintain the calcium sulfate in solution, and concomitantly withdrawing the solid sodium chloride crystals from said evaporating chamber.

6. The process of claim 5 wherein the starch phosphate is present in an amount of from 5 to 500 parts per million on a saturated brine basis.

7. The process of claim 5 wherein the starch phosphate is present in an amount of from 10 to 50 parts per million on a saturated brine basis.

8. The process of claim 5 wherein the rate of brine bleed is in the amount of from 45 percent to 70 percent of the feed brine.

9. A process for preparing a high purity sodium chloride having a reduced calcium sulfate content which comprises continuously feeding a concentrated essentially bicarbonate-free sodium chloride brine containing dissolved calcium sulfate into an evaporating and crystallizing chamber, evaporating and concentrating said brine at a temperature below about 165° F. at a reduced pressure and in the presence of from about 5 to about 500 parts per million on a saturated brine basis of starch phosphate to produce crystalline sodium chloride, concomitantly bleeding brine from said evaporating chamber at a rate equal to from 45 percent to 70 percent of the brine feed rate, and concomitantly continuously withdrawing solid sodium chloride from said evaporating chamber.

10. The process of claim 9 wherein the said starch phosphate compound is present in a concentration of from 10 to 50 parts per million on a saturated brine basis.

11. A process for preparing a high purity sodium chloride having a reduced calcium sulfate content which comprises continuously feeding a concentrated essentially bicarbonate-free sodium chloride brine containing dissolved calcium sulfate into an evaporating and crystallizing chamber, concentrating said brine at a temperature below about 165° F. at reduced pressure and in the presence of from about 5 to 500 parts per million on a saturated brine basis of starch phosphate to produce a crystalline sodium chloride, concomitantly bleeding brine from said evaporating chamber in an amount of from 45 percent to 70 percent of the brine feed, concomitantly withdrawing solid sodium chloride from said evaporating chamber, combining said bleed brine with solid sodum chloride from said evaporating chamber and recovering solid sodium chloride from said mixture.

12. The process of claim 11 wherein the starch phosphate is present in a concentration of from 10 to 50 parts per million.

13. Process for preparing a high purity sodium chloride having a reduced calcium sulfate content which comprises continuously feeding a concentrated essentially bicarbonate-free sodium chloride brine containing dissolved calcium sulfate into an evaporating and crystallizing chamber, concentrating said brine at a temperature below about 165° F. at reduced pressure and in the presence of from about 10 to 50 parts per million on a saturated brine basis of starch phosphate to produce a crystalline sodium chloride, concomitantly bleeding brine from said evaporating chamber in an amount of from 45 percent to 70 percent of the brine feed, concomitantly withdrawing solid sodium chloride from said evaporating chamber as a slurry in saturated brine, filtering and washing said sodium chloride with brine and water, and recovering and drying the sodium chloride from said process.

14. An improved process for producing salt in a multiple effect evaporator system which comprises continuously feeding a concentrated essentially bicarbonate-free sodium chloride brine containing dissolved calcum sulfate into an evaporating and crystallizing chamber, evaporating and concentrating said brine at a temperature below about 225° F. and at reduced pressure in the presence of starch phosphate to crystallize sodium chloride from said brine, concomitantly bleeding brine from said evaporating chamber in an amount of from 45 to 70% of the brine feed, concomitantly withdrawing and recovering solid sodium chloride having a reduced calcium sulfate content from said evaporating chamber, directing said bleed brine containing an enriched dissolved calcium sulfate content to a separate evaporating and crystallizing chamber, concentrating said bleed brine to crystallize sodium chloride therefrom, and recovering the sodium chloride.

No references cited.

UNITED STATES PATENT OFFICE
CERTIFICATE OF CORRECTION

Patent No. 3,155,458                     November 3, 1964

Howard W. Fiedelman et al.

It is hereby certified that error appears in the above numbered patent requiring correction and that the said Letters Patent should read as corrected below.

Column 4, line 31, for "evaporated" read -- evaporator --; column 5, line 29, for "M" read -- B --; column 8, line 50, for "sodum" read -- sodium --; column 9, line 1 and column 10, line 4, for "calcum", each occurrence, read -- calcium --.

Signed and sealed this 30th day of March 1965.

(SEAL)
Attest:

ERNEST W. SWIDER                     EDWARD J. BRENNER
Attesting Officer                   Commissioner of Patents